(12) United States Patent
Crohn et al.

(10) Patent No.: US 7,331,605 B2
(45) Date of Patent: Feb. 19, 2008

(54) AIRBAG MODULE FOR A MOTOR VEHICLE

(75) Inventors: Detlef Crohn, Berlin (DE); Christian Kempe, Aschaffenburg (DE); Thomas Marotzke, Bergfelde (DE)

(73) Assignee: Takata-Petri AG, Aschaffenburg (DE)

( * ) Notice: Subject to any disclaimer, the term of this patent is extended or adjusted under 35 U.S.C. 154(b) by 344 days.

(21) Appl. No.: 10/513,362

(22) PCT Filed: Apr. 30, 2003

(86) PCT No.: PCT/DE03/01470

§ 371 (c)(1),
(2), (4) Date: Apr. 13, 2005

(87) PCT Pub. No.: WO03/093070

PCT Pub. Date: Nov. 13, 2003

(65) Prior Publication Data

US 2005/0248138 A1    Nov. 10, 2005

(30) Foreign Application Priority Data

May 3, 2002    (DE) ............................... 102 21 101

(51) Int. Cl.
*B60R 21/26* (2006.01)
(52) U.S. Cl. .................................. 280/740; 280/736
(58) Field of Classification Search ............... 280/740, 280/742, 739, 732, 736, 728.2, 743.1
See application file for complete search history.

(56) References Cited

U.S. PATENT DOCUMENTS

| 4,101,146 | A |  | 7/1978 | Oehm |
|---|---|---|---|---|
| 5,505,488 | A |  | 4/1996 | Allard |
| 5,558,362 | A |  | 9/1996 | Acker et al. |
| 5,752,712 | A |  | 5/1998 | Acker |
| 5,762,360 | A |  | 6/1998 | Damman |
| 5,988,677 | A |  | 11/1999 | Adomeit et al. |
| 6,029,996 | A | * | 2/2000 | Yoshioka et al. ........... 280/740 |
| 6,676,147 | B2 | * | 1/2004 | Ozaki et al. ................ 280/240 |
| 2004/0232675 | A1 | * | 11/2004 | Marotzke .................... 280/739 |

FOREIGN PATENT DOCUMENTS

| DE | 25 24 770 | A1 | 12/1976 |
|---|---|---|---|
| DE | 296 06 724 | U1 | 11/1996 |
| DE | 296 13 269 | U1 | 11/1996 |
| DE | 299 17 645 | U1 | 2/2000 |

(Continued)

OTHER PUBLICATIONS

Translation of International Preliminary Examination Report for International application No. PCT/DE2003/001470, Jul. 7, 2004.

*Primary Examiner*—Paul N. Dickson
*Assistant Examiner*—Drew J. Brown
(74) *Attorney, Agent, or Firm*—Foley and Lardner LLP

(57) ABSTRACT

The invention relates to an airbag module for a motor vehicle comprising an airbag, a gas generator for inflating the airbag, and a housing for accommodating both the gas generator and the airbag. According to the invention, the airbag (1) and the gas generator (2) are arranged on opposite sides (30*a*, 30*b*) of a wall (30) of the housing (3).

17 Claims, 3 Drawing Sheets

FOREIGN PATENT DOCUMENTS

| | | |
|---|---|---|
| DE | 200 19 636 U1 | 1/2001 |
| EP | 0 668 196 A2 | 8/1995 |
| EP | 0 822 124 A1 | 2/1998 |
| EP | 0 957 009 A2 | 11/1999 |
| EP | 1 112 902 A2 | 7/2001 |
| JP | 8-150890 | 6/1996 |
| JP | 10-500920 | 1/1998 |
| JP | 10067291 A | 3/1998 |
| WO | WO 96/15923 | 5/1996 |
| WO | WO 02/40323 A1 | 5/2002 |

* cited by examiner

AIRBAG MODULE FOR A MOTOR VEHICLE

BACKGROUND

The invention relates to an airbag module for a motor vehicle An airbag module of this type comprises an airbag, a gas generator for inflating the airbag in the event of a crash in order to protect a vehicle occupant, and a module housing for accommodating the gas generator and the airbag.

U.S. Pat. No. 5,762,360 discloses an airbag module for a motor vehicle, which has a base plate with a covering in addition to an airbag and a gas generator. In this case, the airbag and gas generator are arranged on different sides of the base plate. The invention is based on the problem of providing an airbag module that permits the gas generator, on the one hand, and the airbag, on the other hand, to be arranged as variably as possible.

SUMMARY

In one embodiment of the invention, the gas generator, on the one hand, and the airbag, on the other hand, are arranged on mutually opposite sides of a (large) wall of the housing. On the side of the housing wall that serves to accommodate the airbag, a diffuser is arranged and through it gas flowing out of the gas generator is conducted in a defined manner into the airbag that is to be inflated, with the aim of controlling the direction of the gas flow. The diffuser itself is formed above an opening in the housing wall through which gas flowing out of the gas generator can pass into the diffuser.

The solution according to the invention has the advantage that, firstly, by arranging the gas generator and the airbag on two different sides of a housing wall, these two subassemblies are arranged tightly next to each other, with the result that gas flowing out of the gas generator can be conducted in a simple manner into the airbag which is to be inflated, and that, secondly, the shape, size and positioning of the gas generator or airbag is completely independent of the other of the two subassemblies in each case. It is thus possible for an airbag package which is designed as desired and is gathered and/or folded to be arranged on one side of the wall without the geometry, size or positioning of the gas generator on the other side of the wall having had to be taken into consideration. Conversely, the size, shape and positioning of the gas generator on the other side of the wall is also largely independent of the shape and size of the airbag package on the opposite side of the wall. All that has to be ensured is that the gas outlet region of the gas generator interacts with the blow-in mouth of the airbag to be inflated, in such a manner that gas flowing out of the gas outlet region of the gas generator can be injected into the airbag which is to be inflated.

In one particularly preferred embodiment of the invention, a retaining plate is fastened on that side of the housing wall on which the airbag is arranged, the retaining plate resting on the housing wall, with the airbag being clamped between the retaining plate and the housing wall. The retaining plate may be designed, in particular, as a metal retaining plate, and the airbag may be clamped at the edge of its blow-in mouth between the metal retaining plate and the housing wall.

This diffuser may be integrally formed in a simple manner on the retaining plate (e.g. a metal retaining plate).

In a preferred development of the invention, the airbag is folded in such a manner that only one layer of the airbag extends above an upper cover surface of the diffuser in the direction of flow of the gas.

The retaining plate in its entirety can be fastened in a simple manner to the housing wall by means of screws or latching elements and, in a preferred embodiment, furthermore has an integral formation, e.g. a bead, which reaches through an opening in the housing wall and serves to fix the position of the gas generator.

Furthermore, the retaining plate, on the one hand, and the housing wall, on the other hand, can have openings which correspond with one another in order to form an outflow opening, through which gas which has escaped from a vent or a gas permeable fabric of the airbag can be conducted away.

In one advantageous embodiment of the invention, a mount which protrudes from the wall and is intended for the gas generator is integrally formed on the other side of the housing wall that is assigned to the gas generator. The gas generator can be designed, in particular, as a tubular gas generator which is fastened by one axial end to the mount, for example by means of a screw or by means of latching elements.

The mount is designed in such a manner that, together with the housing of the gas generator, it encloses the gas outlet region of the gas generator in order to form an outwardly gas-tight cavity which has just one passage through which gas can flow into the airbag which is to be inflated. In this case, the gas outlet region of the gas generator is understood to be that section on which the discharge openings through which gas can flow out of the gas generator are located.

This gas outlet region can be provided, in particular, on an axial end section of the gas generator, the cavity surrounding only that end section of the gas generator which is provided with the gas outlet region. This enables the gas flowing out of the gas generator to be conducted over a short distance and without multiple deflection in a controlled manner into the airbag which is to be inflated. Furthermore, the loads on the components are minimized.

In addition, at least one further mount for the gas generator can be integrally formed on the housing wall in order to ensure an additional fastening or support of the gas generator.

The solution according to the invention makes it possible, in particular, for the spatial extent of the airbag package arranged on one side of the housing wall to be able to greatly differ along the plane defined by the housing wall and its spatial position from the corresponding extent and position of the gas generator. In particular, the extent of the retainer for the airbag may be considerably larger than the extent of the gas generator in one or other spatial direction if a folding of the airbag in a manner which is as flat as possible together with an appropriate amount of space required in the plane of extension of the airbag is provided.

Further features and advantages of the invention will become clear in the following description of an exemplary embodiment with reference to the figures.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
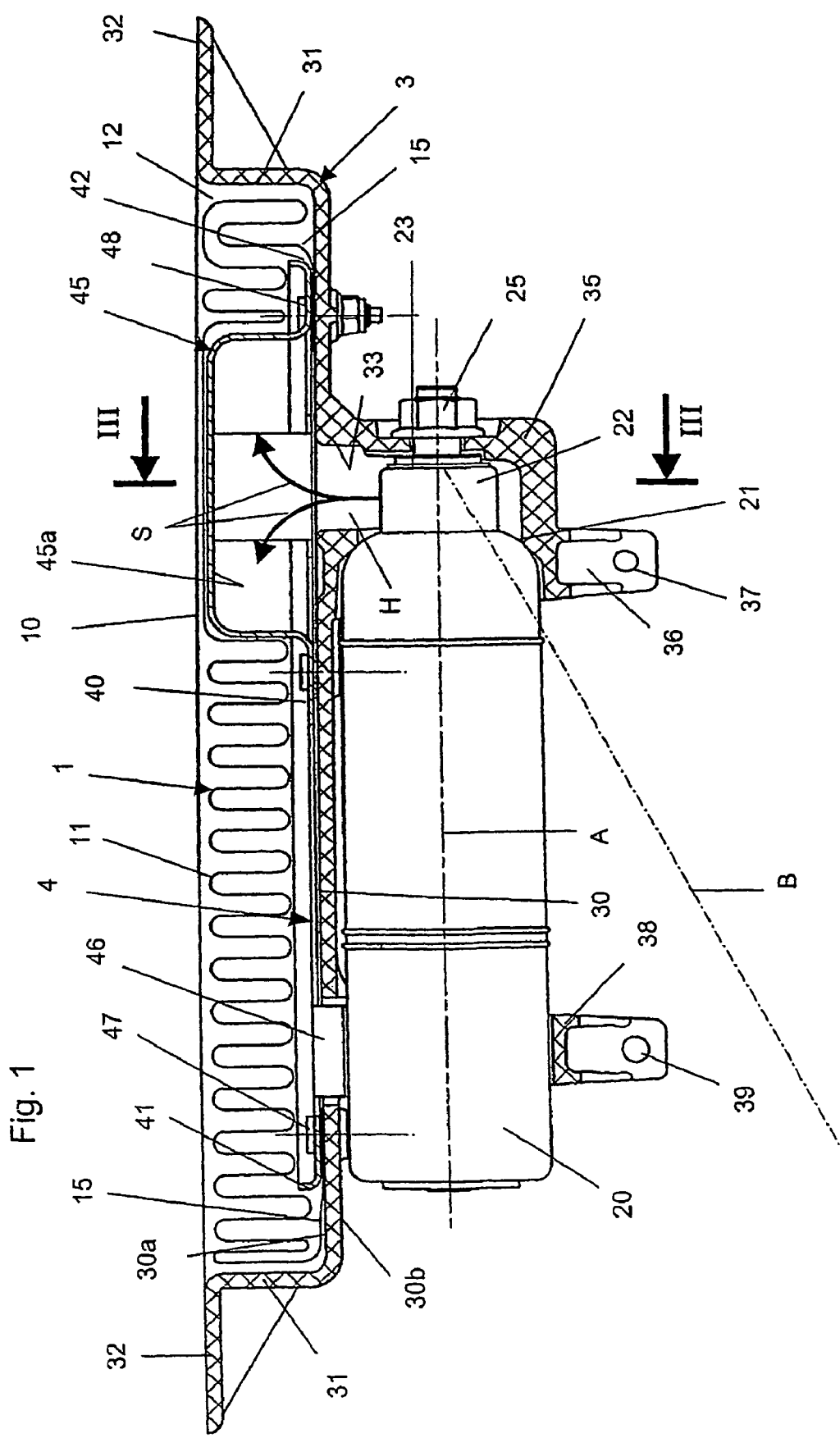
FIG. 1 shows a longitudinal section through an airbag module having an airbag, a gas generator for inflating the airbag, and a module housing.
Figure 2:
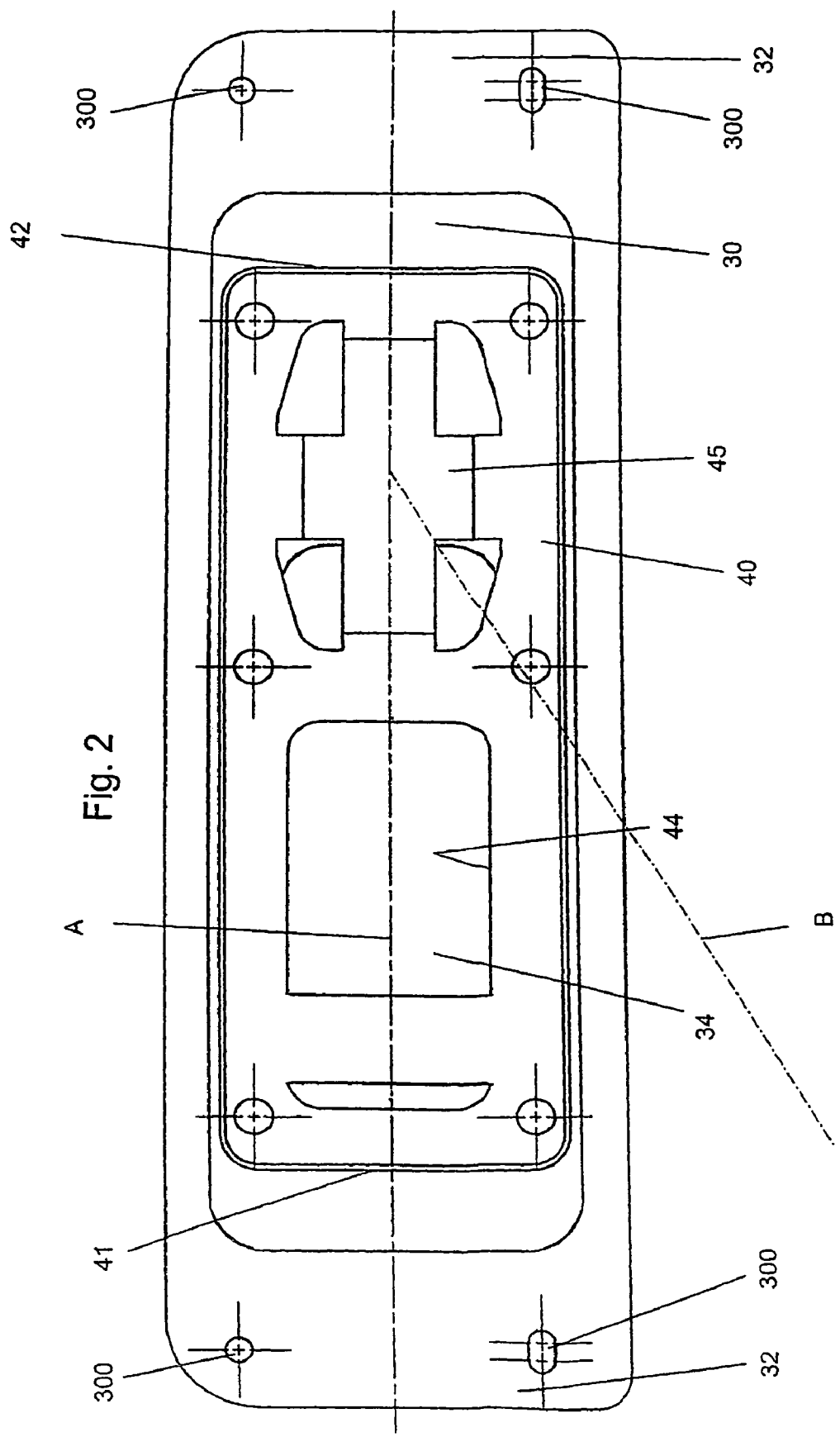
FIG. 2 shows a plan view of the airbag module from FIG. 1 without an airbag.
Figure 3:
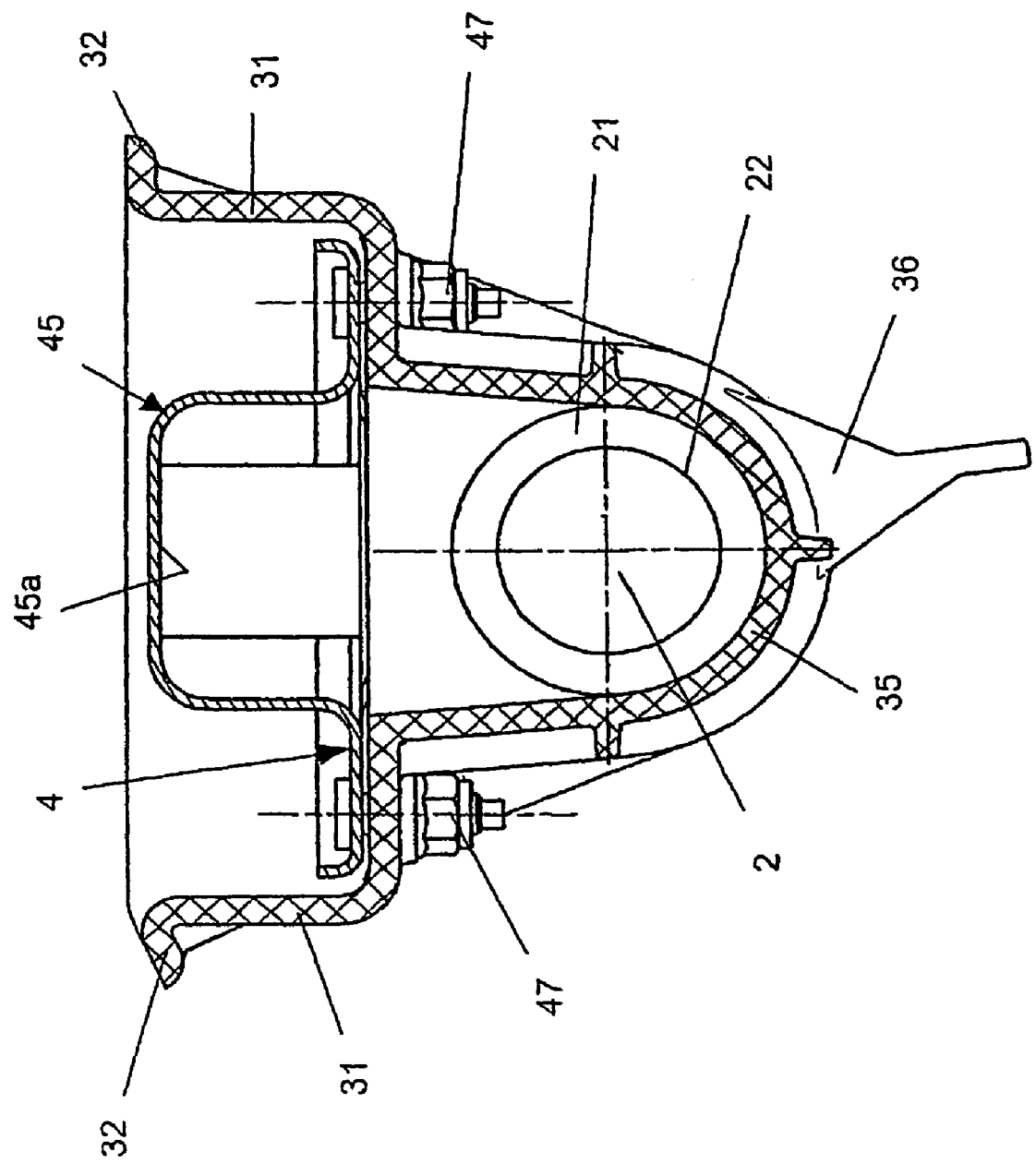
FIG. 3 shows a cross section through the airbag module from FIG. 1.

FIGS. 1 to 3 illustrate three subassemblies of an airbag module for a motor vehicle, namely an airbag 1 which can be inflated in order to protect a vehicle occupant, a gas generator 2 for inflating the airbag 1, and a housing 3 provided for accommodating the airbag 1 and the gas generator 2. The airbag module is a front passenger module which is fitted to the dashboard of a motor vehicle in order to protect the front passenger of a motor vehicle in the event of a crash. The airbag 1 and the gas generator 2 are arranged on mutually opposite sides 30a and 30b, respectively, of a large wall 30, forming a base surface, of the housing 3.

An encircling, lateral boundary wall 31 is integrally formed on that side 30a of the wall 30 (front side) which serves to accommodate the airbag 1, said boundary wall forming together with the housing wall 30, which forms the base surface, a receptacle for the airbag 1, which is folded together to form a package. A section 32 which is provided with fastening openings 300 for fastening the module housing 3 to the dashboard protrudes perpendicularly from the lateral boundary wall 31 which runs along the edge of the housing wall 30.

A first mount 35 for receiving an axial end section of the gas generator 2, which is designed as a tubular gas generator, is provided on the opposite side 30b (rear side) of the housing wall 30 which forms a base surface. A further mount 38 which is integrally formed on the rear side of the housing wall 30 serves for fastening and supporting the gas generator 2 at its other axial end.

The above-described housing 3 preferably consists of plastic, as a result of which, together with a low weight and low heat-absorption capacity of the housing 3, large diversity of shapes of possible types of housing is made possible. The advantage of the low weight can also be achieved with a housing consisting of light metal.

A retaining plate in the form of a metal retaining plate 4 with a large basic body 40 rests on the front side 30a of the housing wall 30, which side serves to accommodate the airbag 1, and is fastened to the housing wall 30 by means of fastening screws 47, 48. The metal retaining plate 4 serves to clamp the airbag 1 by the edge 15 of the blow-in mouth of the airbag 1 being clamped between the edge of the basic body 40 of the metal retaining plate 4 (adjacent to the folded over, lateral end sections 41, 42) and the front side 30a of the housing wall 30.

In addition, a diffuser 45 is integrally formed on the metal retaining plate 4 and serves to control the gas flow emerging from the gas generator and to conduct it in a specific manner into the airbag 1 which is to be inflated. Furthermore, a bead 46 is integrally formed on the metal retaining plate 4 and is intended for the play-free positional securing of the gas generator 2, said bead reaching through an opening in the housing wall 30 and bearing against the housing 20 of the gas generator 2.

The airbag 1 is folded together above the front side 30a of the housing wall 30 and enclosed by the lateral boundary wall 31 of the housing 3 to form an airbag package, the folds of which—as viewed along the longitudinal axis A of the tubular gas generator 2—are arranged next to the diffuser 45 and surround the latter. Different regions 11, 12 of the airbag package are connected to each other by an individual layer 10 of the airbag that extends on the upper cover surface 45a of the diffuser 45.

Owing to the fact that the airbag 1 is stowed as a package in a retainer of the module housing 3 which serves exclusively to accommodate the airbag 1, but not to accommodate the gas generator 2, the airbag package can have any desired shape irrespective of the size and geometry of the gas generator. In the present case, the airbag 1 is folded together to form a very flat package, with a low height perpendicular with respect to the plane of extension of the housing wall 30. In the opposite direction, in the plane of extension of the housing wall 30 the airbag package has a comparatively large extent both parallel to the longitudinal axis A of the gas generator 2 and also perpendicularly thereto. In particular, it can be seen with reference to FIG. 1 that the extent of the airbag 1, which is folded together to form a package, is considerably larger along the longitudinal axis A of the gas generator 2 than the extent of the gas generator 2 itself.

Below one folded section 11 of the airbag 1, openings 34, 44 (compare FIG. 2; the opening 34 is not illustrated in FIG. 1) which correspond with each other are provided in the basic body 40 of the metal retaining plate 4 and in the housing wall 30 and together form an outflow opening for gas which has escaped from the airbag through a vent in the airbag which is to be inflated. This outflow opening 34, 44 which is always open makes it possible to conduct hot gases and particles which have escaped from the inflated airbag away behind the instrument panel of a motor vehicle and as a result to keep them away from the occupants of the vehicle. In this case, in one embodiment, the blow-in mouth and the vent in the airbag may be combined to form a single opening which communicates with the associated openings 33 and 34, 44 in the housing wall 3 and the metal retaining plate 4.

The gas generator 2 which is enclosed by a housing 20 is arranged on the rear side 30b of the housing wall 30, specifically is fastened by an axial end 23, provided with a threaded pin, by means of a nut 25 to the first mount 35, which is integrally formed on the housing wall 30, and is held and supported by its second axial end section in a second mount 38, which is integrally formed on the housing wall 30.

The first axial end section of the gas generator 2 at the same time forms the gas outlet region 22 of the gas generator, which region is provided with discharge openings and from which gas stored in the gas generator 2 and/or produced by means of a chemical reaction emerges in order to inflate the airbag 1, and which has a smaller diameter than the remaining regions of the gas generator 2.

The first mount 35 forms together with a shoulder 21 of the gas generator 2, which shoulder defines the transition to the gas outlet region 22 of the gas generator 2, a cavity H which surrounds the gas outlet region 22 and is sealed to the outside. For this purpose, the first mount 35 bears in a sealing manner against the shoulder 21 of the gas generator 2. The cavity H is connected to the interior of the diffuser 45 merely by one opening 33 in the housing wall 30, and so gas flowing out of the gas outlet region 22 of the gas generator 2 can pass along its direction of flow S from the cavity H through said opening 33 into the interior of the diffuser 45, from where the gas is conducted by means of suitable openings in the diffuser 45 in a defined manner into the airbag 1 which is to be inflated.

Owing to the fact that the cavity H which is acted upon by the pressure of the gas flowing out of the gas outlet region 22 of the gas generator 2 only surrounds the gas outlet region 22, but not further sections of the gas generator 2, the flowing-out gases can be conducted over a short distance and without multiple deflection in a controlled manner in the diffuser 45 and then into the airbag 1 which is to be inflated. Furthermore, the loads on the components are minimized by this.

Passage openings 37, 39 in the form of holes for fitting the airbag module on the vehicle, for example on a cross member, are provided in each case both on an extension 36 of the first mount 35 and on the second mount 38 for the gas generator 2.

The arrangement of the gas generator 2 on the rear side 30b of the housing wall 30, which side faces away from the airbag 1, means that the orientation and position of the gas generator 2 is independent of the shape and size of the airbag package. It is thus in principle possible for the gas generator 2 to be arranged with any desired spatial orientation on the rear side 30b of the housing wall 30. An example of an alternative spatial arrangement of the gas generator 2 is indicated in FIGS. 1 and 2 by a chain-dotted line B which symbolizes the longitudinal axis in an alternative arrangement of the gas generator 2.

The module housing 3 which is described with reference to FIGS. 1 to 3 may also be used to accommodate an airbag if the gas generator 2 is not arranged on the housing itself, but rather at another point in the motor vehicle. In this case, a gas-tight feed line for supplying gas to the gas generator 1 runs from the gas generator 1 to the housing 3. The mounts 35, 38 on the housing 3 would then have to be modified in such a manner that they serve to secure the feed line.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The invention claimed is:

1. An airbag module for a motor vehicle, comprising:
an airbag;
a gas generator for inflating the airbag; and
a housing for accommodating the gas generator and the airbag,
wherein the airbag and the gas generator are arranged exclusively on opposite sides of a wall of the housing,
wherein on the side of the wall on which the airbag is arranged, a diffuser is provided and through it gas flowing out of the gas generator can be conducted into the airbag,
wherein the diffuser is provided above an opening in the wall through which gases flowing out of the gas generator can pass into the diffuser,
wherein a mount is integrally formed on, and protrudes from, the wall on the side provided for accommodating the gas generator, and
wherein the gas generator is fixed by one axial end to the mount.

2. The airbag module as claimed in claim 1, wherein a retaining plate is fastened on the side of the wall on which the airbag is arranged, and wherein the airbag is clamped between the wall and the retaining plate.

3. The airbag module as claimed in claim 2, wherein the retaining plate is a metal retaining plate.

4. The airbag module as claimed in claim 2, wherein the airbag comprises a blow-in mouth between the retaining plate and the wall at which the airbag is clamped.

5. The airbag module as claimed in claim 2, wherein the diffuser is integrally formed on the retaining plate.

6. The airbag module as claimed in claim 2, wherein the retaining plate is fastened to the wall by means of screws or latching elements.

7. The airbag module as claimed in claim 2, wherein a formation that reaches through an opening in the wall and serves for fixing the position of the gas generator is provided integrally on the retaining plate.

8. The airbag module as claimed in claim 1, wherein when the airbag is folded and stowed in the housing, only one layer of the airbag extends above an upper cover surface of the diffuser in a direction of gas flow.

9. The airbag module as claimed in claim 1, wherein a retainer for the airbag with a lateral boundary wall is formed on the wall on the side provided for the arrangement of the airbag.

10. The airbag module as claimed in claim 9, wherein an extent of the retainer for the airbag in an axial direction of the gas generator is different from an extent of the gas generator in the corresponding direction.

11. The airbag module as claimed in claim 9, wherein an extent of the retainer for the airbag in a direction perpendicular to an axial direction of the gas generator is different from an extent of the gas generator in the corresponding direction.

12. The airbag module as claimed in claim 1, wherein the gas generator is designed as a tubular gas generator.

13. The airbag module as claimed in claim 1, wherein at least one further mount is integrally formed on, and protrudes from, the wall on the side provided for accommodating the gas generator.

14. An airbag module for a motor vehicle, comprising:
an airbag;
a gas generator for inflating the airbag; and
a housing for accommodating the gas generator and the airbag,
wherein the airbag and the gas generator are arranged exclusively on opposite sides of a wall of the housing,
wherein on the side of the wall on which the airbag is arranged, a diffuser is provided and through it gas flowing out of the gas generator can be conducted into the airbag,
wherein the diffuser is provided above an opening in the wall through which gases flowing out of the gas generator can pass into the diffuser,
wherein a mount is integrally formed on, and protrudes from, the wall on the side provided for accommodating the gas generator, and
wherein the mount together with the housing of the gas generator encloses the gas outlet region of the gas generator to form a gas-tight cavity that has a passage opening through which gas can flow into the airbag.

15. The airbag module as claimed in claim 14, wherein the gas outlet region is provided on an axial end section of the gas generator.

16. The airbag module as claimed in claim 14, wherein the cavity surrounds the end section of the gas generator that is provided with the gas outlet region.

17. An airbag module for a motor vehicle, comprising:
an airbag
a gas generator for inflating the airbag; and
a housing for accommodating the gas generator and the airbag,
wherein the airbag and the gas generator are arranged exclusively on opposite sides of a wall of the housing,
wherein on the side of the wall on which the airbag is arranged, a diffuser is provided and through it gas flowing out of the gas generator can be conducted into the airbag,
wherein the diffuser is provided above an opening in the wall through which gases flowing out of the gas generator can pass into the diffuser,
wherein a retaining plate is fastened on the side of the wall on which the airbag is arranged, and wherein the airbag is clamped between the wall and the retaining plate, and
wherein openings that correspond with one another in the retaining plate and the wall are provided to form an outflow opening for gas excaping from the airbag.

* * * * *